United States Patent
Arndt

[15] 3,642,493
[45] Feb. 15, 1972

[54] METHOD OF PREPARING A SIMULATED MILK PRODUCT

[72] Inventor: Robert H. Arndt, St. Louis, Mo.

[73] Assignee: Ralston Purina Company, St. Louis, Mo.

[22] Filed: June 1, 1967

[21] Appl. No.: 642,737

[52] U.S. Cl. .................................................99/64, 99/17
[51] Int. Cl. ....................................A23c 11/00, A23j 1/14
[58] Field of Search ..............................................99/98, 64

[56] References Cited

UNITED STATES PATENTS

| | | | |
|---|---|---|---|
| 2,881,159 | 4/1959 | Circle et al. | 260/123.5 |
| 3,001,875 | 9/1961 | Sair | 99/17 |
| 3,303,182 | 2/1967 | Sakai et al. | 260/123.5 |

FOREIGN PATENTS OR APPLICATIONS

| | | | |
|---|---|---|---|
| 70,049 | 12/1959 | India | 99/64 |

OTHER PUBLICATIONS

Altschul, *Processed Plant. Protein Foodstuffs*, Academic Press Inc., New York, 1958, pp. 281-282, and 408-410

Primary Examiner—A. Louis Monacell
Assistant Examiner—William Andrew Simons
Attorney—Price, Heneveld, Huizenga & Cooper

[57] ABSTRACT

A method of preparing a simulated whole milk beverage product by physico-thermo-vapor flash pretreating isolated vegetable protein, preferably isolated soy protein, and combining it with sweet diary whey and special vegetable oil or fat formed by hydrogenating oil in a special procedure, and in controlled proportions, involving mixing of the isolated protein and vegetable oil together while reliquifying or suspending them in water, reliquifying the whey separately, if in dry form, blending the materials, adjusting the pH to a certain range, and homogenizing the materials in a special multiple stage manner.

14 Claims, No Drawings

METHOD OF PREPARING A SIMULATED MILK PRODUCT

BACKGROUND OF THE INVENTION

This invention relates to food beverages, and more particularly to a simulated whole dairy milk beverage product containing vegetable protein and vegetable oil or fat substances, but having the taste and texture of actual whole dairy milk. It also relates to a method of preparing a simulated whole dairy milk using vegetable protein and hydrogenated vegetable oil substances.

The concept of using vegetable materials to prepare so-called "milk" type products has been known for many decades. In fact, many different methods and compositions have been proposed for achieving this. A few of these products have been or are being employed to a limited extent as an additive in foods where the flavor and odor characteristic of vegetable proteins, particularly soy proteins or the like, can be masked by other flavors.

However, as is well known in the industry, even though these vegetable based products have somewhat of a "milky" character, no realistic attempt has been made to try to commercially substitute the actual beverage of whole dairy milk by these simulated milk products since the flavor difference is clear, distinct, and unappealing, the texture difference gives the simulated products a poor and unpleasant "mouth feel," and the appearance of the simulated products is quite unlike milk in color and degree of opacity. Milk is a very bland flavored product and extremely difficult to match in flavor because the stronger flavors of substitute materials have always been clearly detectable. Further, its appearance as a suspension has not been subject to accurate duplication with vegetable food materials, partially because of the high dispersibility of milk solids and low dispersibility of vegetable solids in water, such dispersibility including ability to partially dissolve and partially suspend as tiny nonsettling particles, and partially because of the off-yellow, off-brown, or off-green color of the vegetable based liquid.

Yet, in view of rising dairy costs, and of food shortages in parts of the world, a definite need has existed for a low cost, highly nutritious product that could be substituted freely for whole dairy milk as a beverage, without having to slowly condition people to a completely new taste and appearance of a beverage.

SUMMARY OF THE INVENTION

The primary object of this invention is therefore to provide a simulated milk beverage, using vegetable protein and vegetable oils added to whey, and which simulates fresh whole dairy milk so closely it can actually be substituted directly for whole milk as a beverage, even without the user detecting the substitution. It has a taste like whole milk, an appearance like that of whole milk, both in color and opacity, and has a texture like that of whole milk to produce the characteristic mouth-feel.

Another object of this invention is to provide a method of preparing a simulated dairy milk beverage-type food using whey, vegetable protein, and treated vegetable oils, blending them in a special fashion and under specially controlled conditions, and subsequently heating the blended product in a fashion to effect a beverage with all the nutritional qualities of milk and with all the flavor, appearance, and texture of a milk beverage. The product is of relatively lower cost than the corresponding dairy product, and employs vegetable materials that are in relatively greater abundance than dairy products. In fact, the novel product enables the use of proteins obtained from soybean materials remaining after oil extraction, yet without the characteristic soy odor or flavor being detectable in the very bland beverage produced. Moreover, no added buffering agents need even be used.

The inventive product and method involves a controlled ratio of isolated vegetable protein, preferably soy protein, sweet dairy whey, and controlled hydrogenated vegetable oils; special physico-thermo-vapor flash pretreatment of the vegetable protein; separate blending of the vegetable oils with the vegetable protein with liquification; timely adjustment and/or control of the hydrogen ion concentration; and controlled homogenization of the composite product in a special manner.

DESCRIPTION OF THE PREFERRED EMBODIMENTS

As indicated, the novel beverage product is composed chiefly of a specially pretreated isolated vegetable protein ingredient, sweet dairy whey, and vegetable oils hydrogenated a controlled amount to provide a vegetable fat of a specific melting point range.

ISOLATED VEGETABLE PROTEIN INGREDIENT

The isolated protein ingredient and its preparation will be described first. Isolated vegetable protein normally has a protein content of about 90–94 percent by weight on a dry basis. This protein content can be increased still further by recycling the product through the noted steps. This protein content may vary a few percent in this ingredient without being particularly noticeable in the final product.

This ingredient is preferably a soy protein material. In fact, most of the development work for this invention has been conducted using soy material, although the process could be employed with other isolated vegetable proteins including those from peanuts, sesame seeds, sunflower seeds, flax seeds, cotton seeds, and the like.

The product employs isolated vegetable protein resulting from certain preliminary separation operations. These operations will be described with respect to soybean and edible soy protein products because this was the major area of concern for which the invention was developed, and because the invention is particularly suited for creating a simulated whole milk using soybean materials.

The soybeans forming the starting material are normally flaked, and the oil is extracted from the flakes by solvent extraction. This leaves what is commonly called defatted soybean meal or flakes. These defatted flakes normally have a protein content of about 44 or 50 percent. In processing them to obtain what is called isolated protein, the proteins and soluble soy seed components are first leached out of the flakes in water solution. The proteins are in the form of a fine colloidal suspension in the aqueous liquor, and the soluble components are in solution. The proteins are then precipitated out of the aqueous liquor, washed, and put into water to form a slurry. The pH of the slurry is then neutralized to the pH range of 6.2–6.9 with an edible, food grade alkaline reagent, preferably sodium hydroxide, potassium hydroxide, calcium hydroxide, magnesium hydroxide, or mixtures thereof, to form a colloidal suspension.

After these preliminary operations, the suspension is then given a special physico-thermo-vapor flash treatment for the product herein described.

Specifically, the suspension having a controlled range of solids content, is subjected to dynamic physical working, is rapidly and almost instantly dynamically heated to a controlled elevated temperature range, is held at a controlled elevated temperature under a positive pressure for a brief, controlled time interval, after which the pressure is suddenly released to instantly volatilize part of the moisture and cause objectionable components of unknown type to be entrained by the volatilized moisture, both of which are removed from the suspension. This results in the removal of undesired flavor and odor characteristics while resulting in retention of high dispersibility of the material in water of above 75 percent usually about 85 percent or so. The suspension is then dried, preferably by flash drying, to a white, bland flavored powder which retains the high redispersibility when later added to an aqueous liquid.

The treatment of the isolated soy protein described in general above will now be described specifically in the following paragraphs. The soybean meal or flakes resulting from oil extraction contains many ingredients including complex proteins, sugars, fibers, and others. The proteins and sugars are dissolved out of the solids by adding the flakes to an aqueous bath and adding a food grade alkaline material to raise the pH substantially above 7. Typical of such alkaline reagents are sodium hydroxide, potassium hydroxide, magnesium hydroxide, calcium hydroxide, or other commonly accepted food grade alkaline reagents. The material is then slurried for a period of time sufficient to put the proteins and other water soluble constituents in solution, usually about 30 minutes or so. The resulting liquor solution is separated from the solids, as by passing the material through a screen and/or centrifuging. Preferably, the liquor is then cycled through a clarifier to remove tiny cellular particles.

The soy proteins are then precipitated from the liquor by lowering the pH to an acidic value near or at the isoelectric point of the protein, usually a pH of 4.6–4.9, with the addition of a common food grade acidic reagent such as acetic acid, phosphoric acid, citric acid, tartaric acid, or others. The precipitate is then separated as by centrifuging, and washed with water to substantially remove occluded sugars, except for a minute trace of sugar which is practically impossible to remove. The precipitate is then made into an aqueous slurry by adding water.

The aqueous slurry is then neutralized by adding an edible, food grade, alkaline reagent such as sodium hydroxide, potassium hydroxide, calcium hydroxide, magnesium hydroxide, or mixtures thereof until the pH is within the range of about 6.2–6.9. This converts the slurry to a stable colloidal suspension which is actually a solution-suspension.

The suspension to be further processed should have a controlled solids content of about 3–30 percent by weight, and preferably about 5–17 percent by weight. If it falls below about 3 percent, subsequent processing steps are not economically advisable when a continuous process is employed. Drying is particularly costly. Above about 17 percent solids content, the resulting product does not subsequently lend itself to the preferred flash drying techniques, such as spray drying using a jet or spinning thrower, so that other drying techniques must be employed, to result in a product that is not as desirable in its functional characteristics. Above about 30 percent solids content, brownish discoloration of the product tends to occur during the processing.

Each tiny portion of this suspension is then subjected to a physico-thermo-vapor flash treatment including dynamic, practically instantaneous heating to a controlled elevated temperature range, and dynamic physical working, both preferably performed almost simultaneously. Currently, the most satisfactory way of achieving this is to pass the suspension at high velocity through a device commonly known as a Jet Cooker. It includes adjacent jet nozzle orifices, normally concentric, through which the slurry and pressurized steam used as a heating agent are ejected at high velocities in intersecting flow patterns. Each tiny bit of suspension is instantly dynamically heated by the steam while practically simultaneously being subjected to severe physical forces at the nozzle and by the impacting steam, such physical working being largely of a shearing nature. The physical working of each tiny portion is believed to molecularly expose certain obnoxious substances held to the twisted protein molecules, for further action, and this physical working with the elevated temperature heat treatment is believed to weaken and/or break the tenacious bond between these noxious substances and the complex protein molecules to an extent where these substances can be laded i.e., cured away by flashed off vapors, as described hereinafter. The temperature range to which the suspension is heated for the desired results is about 220°–400° F., although the temperature should not be in the lower region of this range unless the product is subsequently vented into a vacuum chamber after being held under pressure in a special holding chamber explained hereinafter. Normally the temperature should be about 285°–320° F. for best results.

The product is introduced to the jet cooker nozzle at a positive pressure. This pressure should be at a value near the pressure of the steam injected into the suspension, should be sufficient to cause high-velocity discharge of the suspension through the jet nozzle, and must be greater than the pressure in a pressure retention chamber positioned immediately downstream of the nozzle. Normally the steam pressure is about 80–85 p.s.i.g., the suspension line pressure is slightly above the steam pressure, usually about 85–100 p.s.i.g., and the discharge pressure in the chamber downstream of the nozzle is about 75–80 p.s.i.g. The pressure drop of the suspension across the nozzle is about 5–15 p.s.i., depending upon these other pressures, with 6–10 p.s.i. being common.

The time interval of the suspension in the nozzle is estimated to be about one second or less. The nozzle orifice for the suspension is small, being only a fraction of an inch, e.g., about one-eighth inch, so that the suspension solids are subjected to severe dynamic, physical working during passage. The steam intermixes intimately with the solids in the ejected suspension. The amount of steam required is not great, normally being an amount which lowers the solids content of the suspension only about 1–2 percent by weight.

Preferably the nozzle orifices are concentric, with the suspension being ejected from the center orifice, for example, and the steam from a surrounding annular orifice oriented to cause its output flow path to intersect the output flow path of the center orifice. The suspension and steam could be ejected from the alternate orifices however. Further, the adjacent orifices need not necessarily be concentric to obtain this interaction.

As noted previously, the steam and suspension are ejected into a special retention chamber. This may comprise an elongated tube through which the intermixed suspension and steam moves from the jet nozzle on one end of the tube to a pressure controlled discharge on the other end. The size and configuration of this chamber are not really critical. The discharge can be controlled by a conventional preset pressure release valve to enable continuous process flow from the nozzle to and out of the discharge valve. This valve regulates the pressure in the holding chamber. The pressure in this chamber must be great enough to prevent any significant vaporization of the moisture in the chamber, even though the temperature is well above the boiling point of water. A pressure of about 75–80 p.s.i.g. readily achieves this. Since suspension and steam must continuously flow into this pressurized chamber, the pressure behind the suspension and the steam must be greater than the chamber pressure to cause this continuous flow.

The heated suspension is retained in the holding chamber for a definite but relatively short time period of a few seconds up to a few minutes, normally of about 7 seconds to about 100 seconds. It is only necessary to retain the product in this heated condition for a few seconds for optimum product. The time is not too critical in this range, although the longer the suspension is held, the greater the likelihood of undesired gelation of the product with subsequent release of pressure, particularly at higher temperatures of treatment.

The pressure on the suspension is then instantly released by discharging the suspension to a reduced pressure zone, into a suitable receiving means that is normally at or near atmospheric pressure or below. This discharging operation is normally progressive for the suspension that passes progressively through the chamber. This discharge and sudden pressure release causes "flash off" of a portion of the moisture in the form of water vapor which is laden with the entrained odiferous, obnoxious, characteristic, pungent chemical components or substances of unknown composition from the soy product. The flash off also causes substantial cooling of the remaining suspension because of the heat of vaporization absorbed from the suspension, so that the total time which the product is subjected to elevated temperatures is actually very short and controlled. Removal of the substance-laden vapors from the product removes the objectionable flavor and odor characteristics.

This special treatment of the vegetable protein not only removes objectionable odor and flavor, but also importantly causes retention in the product of the property of high redispersibility in water comparable to that possessed by the raw material. In fact, the redispersibility usually decreases only one or two percent, e.g., from about 87 percent to about 85–86 percent for soy protein materials. Conventional treatments of such materials normally lowers dispersibility down to values of about 20 percent or so. The product is also sterilized by this treatment.

The reduced pressure zone into which the suspension is discharged is normally at atmospheric pressure, but it is sometimes subatmospheric, i.e., at a partial vacuum. In either case, the vapors should be instantly conducted away from the suspension, preferably by moving a current of air across the suspension or by drawing a continuous vacuum on the discharge zone to draw the vapors away. The vapors may be specially condensed in a fashion to positively remove the condensate from the area of the collected discharged suspension. In production, the suspension may be discharged from the back pressure control discharge valve directly into a vessel in the open atmosphere where the vapors are allowed and/or caused to rise directly away from the suspension and are prevented from condensing in a manner to allow the condensed substance to flow back into the product. To assure complete removal of the vapors from the purified suspension without allowing the vapors to recondense back into the suspension, the suspension and vapor should be separated immediately after discharge, i.e., immediately after pressure release. In this regard it is undesirable to cause passage of both components through a common conduit downstream of the discharge valve, and if such is done, it should be minimal.

As noted, the most preferred method of physically exposing and thermally and physically releasing the objectionable substances from the protein molecular bundles, for subsequent carry off, is by use of the jet cooker. The intimate violent physical treatment to break up the protein bundles and expose these substances can be practiced by the use of other equipment as for example, by the shearing action of high pressure pumps, followed by momentary heating in an elevated pressure zone, prior to pressure release and flash off. The heating action of the subdivided protein bundles, or the heating plus physical working can be achieved with alternate equipment such as a hot zone flow tube or coil. Such a device causes rapid flow through a constricted tube, one zone of which is exposed to a heat source such as a gas flame. Other alternative apparatuses includes apparatus operating on magneto striction principles, apparatus employing radiofrequency heating and agitation, electrostatic heating apparatus, supersonic wave devices, film diaphragm vibration equipment, and resojet resonating flame apparatus. In fact, one or more of these devices could be combined with the jet cooker to increase the physical working action. Of course, the suspension must be put under a positive pressure in this process to cause the subsequent vapor lading or entraining of the objectionable substances released.

The suspension is then normally flash dried to a uniform, fine, powderous product. Of the flash drying techniques, spray drying is preferable. During production, instead of this purified isolated vegetable protein being dried and subsequently reliquefied, it may be kept in a liquid form, if the liquid content is not too high for obtaining a final 12 percent solids in the final product.

This isolated protein normally has a moisture content of a few percent. Calculated on a dry basis, its protein content is usually about 90–95 percent by weight.

To prepare the final product that simulates fresh whole milk, the isolated protein material is combined in a special manner with pretreated vegetable oil materials and sweet dairy whey.

VEGETABLE OIL OR FAT INGREDIENT

The particular type of edible vegetable oil employed is not critical and may constitute one or more of soy oil, corn oil, coconut oil, safflower oil, and the like. Experimentation has shown that the character of the final product can be controllably varied in its likeness to fresh dairy products by controlled hydrogenation of at least part of the vegetable oils. According to conventional terminology, the term oil is employed when the material is liquid at normal room temperature, while the term fat is employed when the material is solid at room temperature. Since the basic composition remains the same, and since the desired melting point range of the final ingredient is near, at, or somewhat above the room temperature range, the terms oil and fat will be used herein generally interchangeably, except that when nonhydrogenated, the term oil will be applied, and when at least partially hydrogenated, the term fat will be applied, descriptively rather than restrictively. The degree of hydrogenation will vary somewhat depending upon the oils used and the exact nature of the product desired. Specifically, by varying the fraction of the oil hydrogenated or the degree of hydrogenation of part or all of the oil, the degree of whiteness and the degree of creaminess of the final product can be varied between that of fresh whole milk and fresh cream. As a guide, the hydrogenation is regulated so that the melting point of the total combined vegetable fat ingredient to be added is preferably in the range of about 84° F. and 97° F., and should be in the range of about 77°–104° F. It has been found that this can be easily achieved to produce a simulated fresh whole milk, with a mixture of about 50 percent nonhydrogenated oil and about 50 percent hydrogenated oil is used. With this ratio, the 50 percent hydrogenated portion is hydrogenated by conventional techniques to a higher melting point than the final melting point. This portion could be a mixture of soy oil, corn oil, safflower oil, and coconut oil, for example. The nonhydrogenated oil could be soy oil, for example. The entire vegetable oil ingredient could alternatively be hydrogenated to a lesser extent, rather than hydrogenating a portion to a greater extent and then mixing it with another nonhydrogenated portion. By increasing the portion that is hydrogenated above 50 percent, or increasing the degree of hydrogenation, the final product will approach the character of fresh dairy cream. Using the above guidelines, those skilled in this field can vary this process step considerably to obtain the desired results.

Sweet Dairy Whey Ingredient

The third chief ingredient, sweet dairy whey, is obtained as a byproduct from dairy operations such as production of sweet type cheeses, e.g., cheddar cheese. This ingredient is readily available at a relatively low cost compared to other dairy products, either as a powder type solid or as a liquid suspension-solution of whey in water. The protein content of such whey is normally about 12 percent by weight, and this is whey protein since casein protein is not significantly present in whey.

Combining of Ingredients

To create the simulated milk which will have protein, fat, and sugar contents substantially like those of fresh whole milk, the three basic ingredients are combined in controlled proportions, the most preferred being about 21.4 percent specially pretreated isolated vegetable protein, 26 percent vegetable fat and 52.6 percent sweet dairy whey. The vegetable protein, vegetable fat, and sweet dairy whey are combined generally in the normal range of casein protein, butter fat, and whey in whole milk.

The vegetable fat ingredient is not added directly to the whey, but rather is added to and mixed with the isolated vegetable protein ingredient. In one form of the process, these are then dispersed in water to form a colloidal suspension. The pretreated protein ingredient serves as an excellent oil-towater binder to hold the oil substances in suspension. If the vegetable fat is added to the whey, it tends to separate and float on the top of the liquid containing the whey. The whey ingredient is preferably in a dry powder state to be subsequently reliquified, or may be in a liquid suspension-solution state obtained directly from the dairy processors. If in a dry powder state, the whey is added to water of about an equal weight, separate from the vegetable fat and protein ingredients. After preparing these separate dispersions, they are mixed together in preparation for subsequent processing steps.

If the whey ingredient is already in a suspension state, its liquid to solid ratio may be high or low, depending upon the dairy process from which it came, evaporation operations used, etc. If its liquid content is relatively low, the oil and protein ingredients are reliquified in the manner stated above, and the two liquid suspensions are then combined. If, however, the liquid content of the whey is high, e.g., about 95 percent or so, the oil and protein ingredients must be added directly to the whey suspension or else the liquid content of the final product will be too high. Since the final simulated milk product has a solid content of about 12 percent by weight, the amount of water that can be added to the separated ingredients is limited since it is undesirable to subject the final product to an evaporation step. After adding the dry vegetable protein and the vegetable fat to the liquid whey suspension, it is necessary to subject the mixture to an initial homogenization, preferably two stage, to put them into a uniform suspension.

The hydrogen ion concentration of the combined materials is critical to the final product. Specifically, the pH is adjusted to a level of 6.7-7.1 and preferably 6.8-7.0. At a pH slightly less than 6.7, the product will have an unsatisfactory flavor. At a pH of 6.6 or below, the solids tend to settle out of the liquid. At a pH slightly above 7.1 the product will be slightly off color and less attractive. At a pH of 7.2 or above, the appearance and flavor of the product are both less desirable. This pH adjustment is preferably made after the three ingredients are reliquified and mixed. The pH of this mixture is normally low (acidic) and is adjusted to the necessary range by adding a food grade alkaline reagent, preferably sodium hydroxide, potassium hydroxide, calcium hydroxide, magnesium hydroxide, or combinations thereof.

Instead of adjustment of the pH at this preferred state when all ingredients are intermixed, the pH of the whey water solution-suspension may be overadjusted upwardly to a value at which, when it is mixed with the fat-protein-water solution-suspension, will result in a final pH within the noted range. The pH of the protein suspension cannot be overadjusted above the noted range prior to mixing because of the undesired hydrolysis that would result. Alternatively, the protein-fat solution-suspension and the whey solution-suspension each could have their pH separately adjusted to within the controlled range prior to mixing.

If the final product is to be in liquid beverage form, as is normally intended, enough water is added to the mixture to lower the solids content to about 12 percent by weight. If the final product is to be put into a solid powder form by drying, this dilution step is not used.

The mixture is then subjected to severe homogenization which is most readily achieved by a multiple stage, homogenization, preferably two stage. This step is important in order to provide a simulated milk character to the final product. The successive stages are at increasing working intensities. If an hydraulic pressure type homogenizer is used, the pressure at the second stage is substantially greater than that of the first stage. Preferably the pressure at the first stage is about 6000 p.s.i. or above, although it has been found that pressures of 500 p.s.i. and 1500 p.s.i. will provide an acceptable, though less desirable product. If a sonic vibration type homogenizer is employed, it is operated at comparable increasing intensities to get results comparable to the hydraulic type at the noted pressures. These homogenization steps are important since they not only achieve fat or oil particle size reduction for prolonged suspension, but also contribute significantly to obtaining the proper flavor characteristics. The exact technical explanation of this is not known. It has been found that more than two stages can be used, with lower pressures at each stage being possible, but more than two stages are not normally desirable because other characteristics of the product appear to decline.

This final homogenization operation of the total mixture is conducted even where the mixture was previously initially homogenized because of the soy protein and vegetable fat being added directly to the whey liquid without being previously reliquified according to one of the process of variations noted above.

Further, when processing the mixture using this direct addition variation, the mixture, either prior to or after this final two stage homogenizing, should be vacuumized in a manner like that normally used in dairies for skim milk products, unless the final product is flash dried into a powder rather than left in a liquid beverage form. This vacuumizing, wherein the liquid is passed through jet orifices into a vacuum chamber of about 20–28 inches of vacuum, removes certain undesirable flavor characteristics from the whey, just as it does in dairy processing, and eliminates gaseous substances such as carbon dioxide. If the mixture is flash dried to form the product in a powder state, the drying step accomplishes results similar to the vacuumizing step necessary for the liquid beverage.

The final product to be used directly as a beverage is pasteurized, cooled to control bacteriological growth, and placed in containers such as bottles, cans, sealed cartons, or tank cars.

If the final product is to be placed in powder form for later reliquification or use as an additive or the like, it is flash dried, as by spray drying techniques, and put into bags or cartons or the like.

As noted previously, the three basic ingredients are preferably in the amounts of 21.4 percent by weight pretreated vegetable (soy) protein, 26 percent vegetable fat, and 52.6 percent sweet dairy whey. Actually, either the vegetable protein ingredient or the whey ingredient may be varied plus or minus about 5 percent by weight from these designated values, and still be able to produce an acceptable substitute beverage for fresh whole milk. However, if one is lowered, the other preferably should be increased an amount sufficient to prevent the protein level dropping too low. Thus, the soy protein may be varied between about 16 and 27 parts by weight without drastically altering the product, and the whey may be varied between about 47 and 58 parts by weight. Further, the fat content can be varied somewhat, although if it becomes too low, e.g., below about 15 parts by weight, the flavor definitely departs from that of whole fresh milk and assumes a taste which is not desirable as a milk beverage. If the fat content is increased above about 26 parts by weight, a cream type product is obtained which is not really a beverage but is useful as a dairy cream substitute. If the ingredients are maintained at the preferred range, or within several percent thereof, the final product produced can actually be substituted for fresh whole milk, even as a beverage, without the user detecting it. This substitution has actually been made with employees of the assignee herein, without detection. Moreover, the novel product is just as nutritious as whole dairy milk, and has longer keeping ability. Its protein content can be readily increased by increasing the soy protein percentage within the limits noted. It further contains no butter fat.

Although one of the major advantages of the novel product is its ready capacity for substitution for whole fresh milk, it can also be used as an additive in cooking or a basic ingredient for food products such as simulated ice cream and puddings.

The basic principles of the novel product and process set forth above will enable anyone having ordinary skill in the art to practice the invention, and if desired, to make controlled variations within the concept. To assure a complete understanding of the invention, the following illustrative examples are set forth.

EXAMPLE 1

A. If raw soybeans are the starting material, the soybeans are flaked and the oil extracted with hexane to give defatted flakes which when ground are commonly called soybean meal.

B. The flakes or meal are added to an aqueous bath, and a food grade alkaline reagent, sodium hydroxide, is added until a pH of 10 is reached. The material is slurried for 30 minutes, and then centrifuged to separate the liquor from the solids. The soy protein material is then precipitated from the separated liquor by adding acetic acid until the isoelectric point is reached at a pH of about 4.7. Normally, this precipitate is about 90–95 percent protein. The precipitate is washed with water, and then added to water to make an aqueous slurry of 15 percent solids by weight. The slurry is neutralized by adding a mixture of food grade sodium hydroxide and calcium hydroxide until the pH is 6.4, thereby converting the slurry to a stable suspension.

C. The suspension is then passed through a jet cooker under a pressure of 85 p.s.i.g., simultaneously with steam ejection from the jet cooker under a pressure of 75 p.s.i.g. The steam heats the suspension almost instantaneously, e.g., in about 1 second, to a temperature of 310° F. The heated suspension is held for seven seconds under the elevated pressure which is high enough to prevent evaporation at that temperature, and then progressive portions of the heated suspension are discharged into a receiver at atmospheric pressure or below, causing flash off of vapors laden with obnoxious smelling and testing substances. The suspension is cooled by the flash off vaporization. The substance laden vapors are removed from the purified suspension. The suspension is flash dried in a spray drier to a moisture content of 3 percent to result in a white isolated soy protein powder having a soy protein content of about 90–94 percent on a dry basis, and a water dispersibility of about 85 percent.

D. 21.4 pounds of this pretreated isolated soy protein ingredient are then mixed with 26 pounds of vegetable fat hydrogenated to have a melting point of 90° F. This pretreated vegetable protein ingredient and fat ingredient are mixed into 25 pounds of water. Separately 52.6 pounds of sweet dairy whey are mixed in 52.5 pounds of water. The isolated protein-fat-water solution-suspension is then added to and mixed with the whey-water solution-suspension. The pH is adjusted to 6.8 by adding sodium hydroxide.

E. Enough water is then added to dilute the material to a 12 percent by weight solids content. The 12 percent mixture is then homogenized through two stages, the first at 2000 p.s.i. and the second at 6000 p.s.i.

F. The product is then pasteurized in a manner typical of dairy products, is vacuumized to eliminate gases such as carbon dioxide and to improve flavor, by ejecting it into a vacuum chamber at 25 or so inches of water vacuum. It is then cooled to 49° F. and placed in containers.

EXAMPLE 2

The starting material is defatted soybean meal, and the steps in Example 1 are followed down to E. The product is not diluted with water in step E, but passed directly through the two stage homogenization at pressures of 1500 and 4000 p.s.i. The product is then pasteurized with or without vacuumizing, dried with a spray drier, and packaged. It may be reconstituted as a liquid and used as a substitute for sweet dairy whole milk. The reconstituted liquid is not as fine a product as in Example 1, but is acceptable within the broader aspects of the invention.

EXAMPLE 3

The starting material is an isolated peanut protein slurry, and the steps in Example 1 are followed down to D. 2.58 pounds of the isolated protein ingredient are then mixed with 2.95 pounds of the vegetable fat ingredient having a melting point of 84° F., and both are added to 100 pounds of a sweet dairy liquid whey containing about 5 pounds of whey solids. The mixture is then homogenized through a two stage homogenization, before or after adjusting the pH to 6.9 by adding a mixture of sodium hydroxide and calcium hydroxide. It is then pasteurized and vacuumized as with dairy products. It is then passed through a two stage homogenization at pressures of 1000 p.s.i. and 5000 p.s.i. respectively, cooled to 35° F. and placed in containers.

EXAMPLE 4

The process in Example 1 is followed, except that the isolated soy protein ingredient content is 19 percent by weight, the sweet dairy whey is 56 percent by weight and the vegetable fat content is 22 percent by weight.

EXAMPLE 5

The process in Example 1 is followed except that the physico-thermo-vapor flashed isolated vegetable protein ingredient is from oil-extracted sunflower seeds; the vegetable fat ingredient is a mixture of two portions, 50 percent being nonhydrogenated soy oil, 50 percent being a mixture of soy oil, coconut oil, safflower oil, and corn oil hydrogenated to a melting point of about 120° F., the resulting vegetable fat melting point being about 90° F; the ratio of the ingredients is 25 percent isolated vegetable protein, 22 percent vegetable fat, and 48 percent sweet dairy whey; the pH is adjusted to 6.9 with calcium hydroxide, the two stage homogenizing is at 700 p.s.i. and 3000 p.s.i., and the product is diluted to 12 percent solids for use as a health beverage.

Hundreds of additional examples could be set forth, but would only unduly lengthen this description because the teachings are clearly set forth. Those having ordinary skill in the art will recognize several variations of the process and product described within the unique concepts set forth. It is therefore intended that the invention encompass all such variations within the scope of the claims attached and all reasonable equivalents thereof.

I claim

1. A method of preparing a simulated sweet milk product comprising the steps of: preparing an aqueous slurry of a neutralized isolated vegetable protein ingredient, having a solids content within the range of 3 –30 percent, heating the slurry rapidly to temperatures of about 220° F. to about 400° F., and subjecting it to dynamic physical working, retaining the slurry for a brief period of time under a positive pressure sufficiently high to prevent volatilization of heated water vapor from the heated slurry, suddenly releasing the pressure to cause flash off volatilization of vapor laden with substances that possess undesireable flavor and odor characteristics, separating the vapors from the treated vegetable protein ingredient; blending said treated vegetable protein ingredient with a vegetable fat having a melting point generally of about 77°–104° F., to cause said vegetable protein to act as a fat and water binder, and mixing both with an aqueous suspension-solution of sweet dairy whey, the proportion of vegetable protein, vegetable fat, and whey being generally about that of the proportion of casein protein, butter fat, and whey in sweet dairy milk and adjusting the pH to within the range of 6.7–7.1; and subjecting the mixture to severe homogenization for effecting proper flavor as well as excellent dispersion.

2. The method in claim 1 wherein said vegetable protein ingredient and vegetable fat are added directly to the aqueous solution of sweet dairy whey, subjected to a first homogenization, then pasteurized, vacuumized, and subsequently subjected to a second homogenization that includes at least two stages.

3. The method in claim 1 wherein at least a portion of said vegetable fat is hydrogenated sufficiently to effect a combined melting point of the entire vegetable fat ingredient of about 84°–97 F.

4. The method in claim 1 wherein said ingredients are proportioned within the range of about 16 –27 parts by weight vegetable protein, about 47 –58 parts by weight sweet dairy whey, and about 15 –26 parts by weight vegetable fat.

5. A method of preparing a simulated sweet milk product comprising the steps of: preparing an aqueous slurry of a neutralized isolated soy protein ingredient, having a solids content within the range of 3–30 percent, heating the slurry rapidly to temperatures of about 220° F. to about 400° F., and subjecting it to dynamic physical working, retaining the slurry for a brief period of time under a positive pressure sufficiently high to prevent volatilization of heated water vapor from the heated slurry, suddenly releasing the pressure to cause flash off volatilization of vapor laden with substances that possess undesirable flavor and odor characteristics, separating the vapors from the treated soy protein ingredient; blending said treated soy protein ingredient with a vegetable fat having a melting point generally of about 77°–104° F., to cause said soy protein to act as a fat and water binder, and mixing both with an aqueous suspension-solution of sweet dairy whey, the proportion of soy protein, vegetable fat, and whey being generally about that of the proportion of casein protein, butter fat, and whey in sweet dairy milk and adjusting the pH to within the range of 6.7–7.1; and subjecting the mixture to severe homogenization for effecting proper flavor as well as excellent dispersion.

6. The method in claim 5 wherein said isolated soy protein and vegetable fat are put into one aqueous suspension-solution separate from said sweet dairy whey aqueous solution, and the two are then mixed together.

7. The method in claim 5 wherein said isolated soy protein and vegetable fat are added directly to the aqueous solution of sweet dairy whey, subjected to initial homogenization, then pasteurized, vacuumized, and subsequently subjected to a second homogenization that includes at least two stages of increasing severity.

8. The method in claim 5 wherein said pH is adjusted by adding one of the food grade alkaline reagents consisting of sodium hydroxide, calcium hydroxide, magnesium hydroxide, and mixtures thereof.

9. The method in claim 5 wherein said beverage product is adjusted to a solid content of about 12 percent by weight.

10. A method of preparing a simulated sweet milk product comprising the steps of: preparing an aqueous slurry of a neutralized isolated soy protein ingredient, having a solids content within the range of 3–30 percent, heating the slurry rapidly to temperatures of about 285° F. to about 320° F., and subjecting it to dynamic physical working, retaining the slurry for a period of time of about 7 seconds to about 100 seconds under a positive pressure sufficiently high to prevent volatilization of heated vapor from the heated slurry, suddenly releasing the pressure to cause flash off volatilization of vapor laden with substances that possess undesirable flavor and odor characteristics, separating the vapors from the treated soy protein ingredient; blending said treated soy protein ingredient with a vegetable fat having a melting point generally of about 77°–104° F., to cause said soy protein to act as a fat and water binder, and mixing both with an aqueous suspension-solution of sweet dairy whey, the proportion of soy protein, vegetable fat, and whey being generally about that of the proportion of casein protein, butter fat, and whey in sweet dairy milk and adjusting the pH to within the range of 6.7–7.1, and subjecting the mixture to severe homogenization for effecting proper flavor as well as excellent dispersion.

11. The method in claim 10 wherein said vegetable fat has a melting point between about 84°–97° F.

12. The method in claim 10 wherein said pH is adjusted by adding one of the food grade alkaline reagents consisting of sodium hydroxide, potassium hydroxide, calcium hydroxide, magnesium hydroxide, and mixtures thereof.

13. The method in claim 10 wherein said beverage product is adjusted to a solid content of about 12 percent by weight.

14. The method in claim 10 including the step of flash drying said treated soy protein to a fine powder and blending said soy protein powder and said vegetable fat in an aqueous solution prior to mixing with the sweet dairy whey.

* * * * *